(12) United States Patent
Li et al.

(10) Patent No.: US 10,665,827 B2
(45) Date of Patent: May 26, 2020

(54) CAP ASSEMBLY FOR A SECOND BATTERY AND SECOND BATTERY

(71) Applicant: Contemporary Amperex Technology Co., Limited, Ningde, Fujian (CN)

(72) Inventors: Quankun Li, Ningde (CN); Baisong Chen, Ningde (CN); Jian Guo, Ningde (CN); Peng Wang, Ningde (CN); Taosheng Zhu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 361 days.

(21) Appl. No.: 15/894,767

(22) Filed: Feb. 12, 2018

(65) Prior Publication Data

US 2019/0067649 A1 Feb. 28, 2019

(30) Foreign Application Priority Data

Aug. 30, 2017 (CN) .......................... 2017 1 0764129

(51) Int. Cl.
*H01M 2/04* (2006.01)
*H01M 2/06* (2006.01)
(Continued)

(52) U.S. Cl.
CPC ........... *H01M 2/0426* (2013.01); *H01M 2/04* (2013.01); *H01M 2/06* (2013.01); *H01M 2/1229* (2013.01);
(Continued)

(58) Field of Classification Search
None
See application file for complete search history.

(56) References Cited

U.S. PATENT DOCUMENTS 5,691,073 A * 11/1997 Vu ................. H01H 37/043
429/170
6,555,263 B1 * 4/2003 Kim ................. H01M 2/1241
429/53
(Continued)

FOREIGN PATENT DOCUMENTS

CN 103208595 A 7/2013
CN 205666259 U 10/2016
(Continued)

OTHER PUBLICATIONS

Extended European Search Report for European Application No. 18155615.0, dated Jun. 11, 2018, 5 pages.

*Primary Examiner* — Rena Dye Cronin
(74) *Attorney, Agent, or Firm* — Law Offices of Liaoteng Wang

(57) ABSTRACT

The present disclosure provides a cap assembly for a secondary battery and a secondary battery. The cap assembly for the secondary battery includes a cap plate having an electrode lead-out hole; and a terminal assembly including a terminal board, a fixing member, a deformable sheet, a conductive sheet and an isolator, wherein the deformable sheet is attached to the terminal board; the conductive sheet includes a first portion provided between the terminal board and the cap plate; the terminal board is fixed to a side of the cap plate through the fixing member and covers the electrode lead-out hole, and the terminal board is electrically connected with the first portion through the deformable sheet; the deformable sheet is configured to deform to be electrically disconnected from the first portion in response to an increase in a pressure inside the secondary battery.

20 Claims, 9 Drawing Sheets

(51) Int. Cl.
*H01M 2/12* (2006.01)
*H01M 2/30* (2006.01)
*H01M 10/04* (2006.01)

(52) U.S. Cl.
CPC ......... *H01M 2/30* (2013.01); *H01M 10/0459* (2013.01); *H01M 2200/20* (2013.01)

(56) References Cited

U.S. PATENT DOCUMENTS

| | | | |
|---|---|---|---|
| 8,580,425 B2 * | 11/2013 | Kim | H01M 2/0426 429/163 |
| 2009/0155632 A1 * | 6/2009 | Byun | H01M 2/0426 429/7 |
| 2010/0040943 A1 * | 2/2010 | Kim | H01M 2/0426 429/163 |
| 2015/0303443 A1 | 10/2015 | Yokoyama et al. | |
| 2016/0204397 A1 * | 7/2016 | Cai | H01M 2/0482 429/175 |
| 2017/0077485 A1 * | 3/2017 | Fujiwara | H01M 2/0486 |
| 2017/0352860 A1 * | 12/2017 | Li | H01M 2/345 |
| 2018/0019459 A1 * | 1/2018 | Lobert | H01M 2/22 |
| 2018/0233714 A1 * | 8/2018 | Guo | H01M 2/202 |
| 2019/0067650 A1 * | 2/2019 | Li | H01M 2/1016 |

FOREIGN PATENT DOCUMENTS

| | | | | |
|---|---|---|---|---|
| CN | 106784445 | * | 5/2017 | ............. H01M 2/04 |
| CN | 105870375 | * | 8/2017 | ............ H01M 10/34 |
| CN | 108232052 A | | 6/2018 | |
| WO | 2010088332 A1 | | 8/2010 | |

* cited by examiner

US 10,665,827 B2

CAP ASSEMBLY FOR A SECOND BATTERY AND SECOND BATTERY

CROSS-REFERENCE TO RELATED APPLICATION

This application is based upon and claims priority to Chinese Patent Application No. 201710764129.3, filed on Aug. 30, 2017, the content of which is incorporated herein by reference in its entirety.

TECHNICAL FIELD

The present disclosure relates to the technical field of energy storage devices, and in particular, to a cap assembly for a secondary battery and a secondary battery.

BACKGROUND

New energy vehicles are widely promoted in the country and even in the world. However, in order to completely replace fuel vehicles, there are many areas for improvement. For example, there are a few problems such as low travelling mileages of vehicles, high cost of battery packs, reliability of battery packs and the like, which need to be further solved. In view of these problems, higher requirements have been proposed for a power battery as a core part of an electric vehicle, such as higher energy density, lower cost and so on.

For the power battery, in order to overcome the problem of overcharging, a conventional solution in the industry is to cut off the path of charging and discharging of the power battery before the failure of an electrode assembly, so as to prevent the power battery from continuing to be charged and thus ensure the safety of the power battery. A common structure is that a through hole is provided in a cap plate, one end of a conductive sheet is electrically connected with the electrode assembly, and the other end of the conductive sheet is inserted into the through hole and electrically connected with a terminal board through a deformable sheet provided on the terminal board. In this structure, in order to fix the conductive sheet, a part of the conductive sheet near the electrode assembly needs to go beyond an outer edge of the through hole, and the part of the conductive sheet beyond the outer edge of the through hole needs to be wrapped by insulating plastic so as to be fixed with the insulating plastic. Then the insulating plastic is fixed under the cap plate so that the conductive sheet is fixed to the cap plate.

However, with the above described structure, since the insulating plastic is located under the cap plate and the conductive sheet is only fixed by the insulating plastic, the insulating plastic may be loose under the action of gravity of the conductive sheet and the insulating plastic during long-term use and as a result, the reliability of the connection between the conductive sheet and the cap plate may decrease. Meanwhile, the insulating plastic for wrapping the conductive sheet may occupy an internal space of a case of the power battery, thereby increasing the thickness of a cap assembly and affecting the energy density of the power battery.

There is another structure in which the conductive sheet is directly welded onto the cap plate, one end of the conductive sheet is electrically connected with the electrode assembly, and the other end of the conductive sheet is electrically connected with the terminal board through the deformable sheet provided on the terminal board. With this structure, since the conductive sheet is directly connected with the cap plate, the on-resistance between the conductive sheet and the cap plate is very small. In a nail penetration test, when a nail pierces the case (the cap plate is connected with the case) and the electrode assembly, a large external short-circuit current will be generated, possibly causing sparking which may trigger fire or other security problems.

SUMMARY

According to an aspect of the embodiments of the present disclosure, a cap assembly for a second battery is provided. The cap assembly includes a cap plate and a terminal assembly, wherein the cap plate has an electrode lead-out hole and the terminal assembly includes a terminal board, a fixing member, a deformable sheet, a conductive sheet and an isolator, wherein: the deformable sheet is attached to the terminal board; the conductive sheet includes a first portion, wherein the first portion is provided between the terminal board and the cap plate and an outer peripheral surface of the first portion protrudes out of an inner wall of the electrode lead-out hole; an outer peripheral surface of the conductive sheet is surrounded by the isolator, and the conductive sheet is connected with the cap plate through the isolator; the terminal board is fixed to a side of the cap plate through the fixing member and covers the electrode lead-out hole, and the terminal board is electrically connected with the first portion through the deformable sheet; the deformable sheet is configured to deform to be electrically disconnected from the first portion in response to an increase in a pressure inside the secondary battery.

According to an aspect of the embodiments of the present disclosure, the isolator has a rotary structure and includes a bonding portion for the conductive sheet; the bonding portion for the conductive sheet is provided with a first annular groove in its inner wall; an outer peripheral edge of the first portion is inserted into the first annular groove to isolate the conductive sheet from the cap plate; and the bonding portion for the conductive sheet is compressed tightly between the terminal board and the cap plate.

According to an aspect of the embodiments of the present disclosure, the electrode lead-out hole is radially expanded on a side close to the terminal board so as to form a depressed portion on the cap plate, and the bonding portion for the conductive sheet and the first portion are accommodated in the depressed portion.

According to an aspect of the embodiments of the present disclosure, the cap assembly further includes a lower insulator, wherein the lower insulator is provided with a first through hole corresponding to the electrode lead-out hole; and the lower insulator is fixed to a side of the cap plate away from the terminal board through the isolator.

According to an aspect of the embodiments of the present disclosure, the isolator further includes a bonding portion for the insulator connected with the bonding portion for the conductive sheet; the bonding portion for the insulator is provided with a second annular groove in its outer wall; a circumferential edge of the electrode lead-out hole and a circumferential edge of the first through hole are simultaneously mounted in the second annular groove so as to fix the lower insulator to the isolator.

According to an aspect of the embodiments of the present disclosure, the terminal board is provided with an accommodating cavity on a side facing the electrode lead-out hole, and the deformable sheet covers the accommodating cavity.

According to an aspect of the embodiments of the present disclosure, the deformable sheet further includes a protruding portion provided on a side of the deformable sheet close to the cap plate; the protruding portion has a thickness greater than that of a remaining portion of the deformable sheet; and the deformable sheet is connected with the first portion of the conductive sheet through the protruding portion.

According to an aspect of the embodiments of the present disclosure, the conductive sheet is provided with a vent hole communicating with the deformable sheet along a flipping direction of the deformable sheet.

According to an aspect of the embodiments of the present disclosure, the conductive sheet further includes a thinner portion and the first portion is connected with the protruding portion through the thinner portion, so that when the deformable sheet deforms, the conductive sheet is broken along the thinner portion and the protruding portion is electrically disconnected from the first portion.

According to an aspect of the embodiments of the present disclosure, the isolator is made of an insulating material; the cap assembly further includes a resistance member; the terminal board is electrically connected with the cap plate through the resistance member; and the resistance member has a resistance value greater than that of the cap plate, the terminal board or the conductive sheet.

According to an aspect of the embodiments of the present disclosure, the resistance member includes a column that penetrates the fixing member and is respectively in contact with the terminal board and the cap plate.

According to an aspect of the embodiments of the present disclosure, the cap assembly further includes a sealing member, wherein the sealing member surrounds the electrode lead-out hole and is compressed tightly between the terminal board and the cap plate.

According to an aspect of the embodiments of the present disclosure, the sealing member is respectively in contact with the terminal board and the cap plate and serves as the resistance member; and the sealing member is made of conductive rubber having a predetermined resistance value.

According to an aspect of the embodiments of the present disclosure, the fixing member serves as the resistance member and is made of conductive plastic having a predetermined resistance value.

According to an aspect of the embodiments of the present disclosure, the cap assembly further includes a connection member, wherein the fixing member is fixed to the cap plate through the connection member; and at least part of an outer peripheral surface of the terminal board is surrounded by the fixing member so that the terminal board is fixed to the fixing member.

According to another aspect of the embodiments of the present disclosure, a secondary battery is provided. The secondary battery includes a case having an opening; an electrode assembly accommodated in the case, including a first electrode plate, a second electrode plate and a separator disposed between the first electrode plate and the second electrode plate; and the above described cap assembly, wherein the cap assembly covers the opening of the case and encloses the electrode assembly in the case.

According to another aspect of the embodiments of the present disclosure, the secondary battery further includes a wiring board, wherein the first electrode plate is connected with the conductive sheet through the wiring board.

According to another aspect of the embodiments of the present disclosure, the wiring board includes a main body portion and an extension portion connected to the main body portion; the main body portion is located on a side of the cap plate away from the terminal board; and the extension portion extends into the electrode lead-out hole and is electrically connected with the conductive sheet.

According to another aspect of the embodiments of the present disclosure, the conductive sheet further includes a second portion that is connected to the first portion and extends into the electrode lead-out hole to be electrically connected with the wiring board.

According to another aspect of the embodiments of the present disclosure, the wiring board has a recessed portion formed on a side of the main body portion away from the cap plate by being provided with the extension portion; the extension portion is provided with a second through hole corresponding to the vent hole on the conductive sheet; and the deformable sheet communicates with the inside of the case through the second through hole and the vent hole.

According to another aspect of the embodiments of the present disclosure, the first electrode plate includes a coating area coated by active materials and a first electrode tab extending from the coating area; and the first electrode tab is bent and connected with the main body portion.

BRIEF DESCRIPTION OF THE DRAWINGS

The present disclosure may be better understood from the following descriptions of specific embodiments of the present disclosure by taken in conjunction with the accompanying drawings, in which.

Other features, objects, and advantages of the present disclosure will become more apparent by reading the following detailed descriptions of non-limiting embodiments with reference to the accompanying drawings, in which the same or similar reference signs denote the same or similar features.

Figure 1:
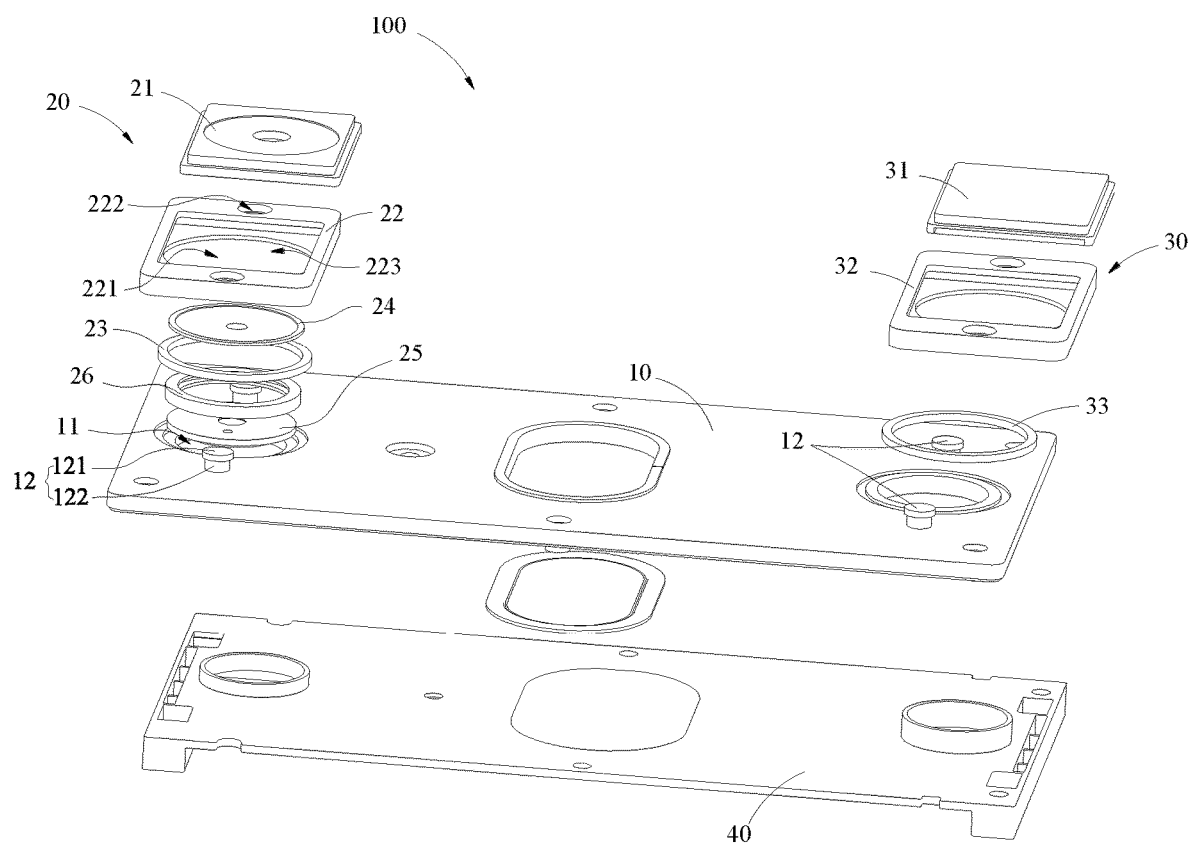
FIG. 1 is a schematic diagram of an exploded structure of a cap assembly of a second battery according to an embodiment of the present disclosure.

REFERENCE LABELS IN THE FIGURES:

1—Secondary battery
100—Cap assembly

101—Cap assembly
102—Cap assembly
103—Cap assembly
200—Case
300—Electrode assembly
310—First electrode tab
320—Second electrode tab
500—Wiring board
510—Main body portion
520—Extension portion
10—Cap plate
11—Electrode lead-out hole
12—Riveting member
121—Nail body
122—Limiting portion
13—Liquid injection hole
14—Anti-explosion valve assembly
20—Terminal assembly
21—Terminal board
211—Accommodating cavity
22—Fixing member
221—Through hole
222—Connection hole
223—Accommodation space
23—Sealing member
24—Deformable sheet
241—Protruding portion
25—Conductive sheet
251—First portion
252—Second portion
253—Vent hole
254—Thinner portion
26—Isolator
261—Bonding portion for the conductive sheet
262—Bonding portion for the insulator
30—Terminal assembly
31—Terminal board
32—Fixing member
33—Sealing member
40—Lower insulator
41—First insulator

DETAILED DESCRIPTION

The features and exemplary embodiments of the various aspects of the present disclosure will be described in detail below. In the following detailed description, numerous specific details are set forth in order to provide a thorough understanding of the present disclosure. It will be apparent, however, to those skilled in the art that the present disclosure may be practiced without some of these specific details. The following description of embodiments is only provided by illustrating examples for a better understanding of the present disclosure. In the drawings and the following description, at least a part of well-known structures and techniques are not shown in order to avoid unnecessarily obscuring the present disclosure. Further, for clarity, the size of a part of the structures may be exaggerated. The same reference numerals in the drawings denote the same or similar structures, and thus their detailed description will be omitted. Furthermore, the features, structures, or characteristics described below can be combined in any suitable manner in one or more embodiments.

The terms denoting directions that appear in the following description indicate directions shown in the drawings, and do not limit specific structures of the cap assembly and the secondary battery of the present disclosure. In the description of the present disclosure, it should also be noted that the terms "mounted", "connected" and "connection" should be interpreted in a broad sense unless explicitly defined and limited otherwise. For example, it may indicate "fixed connection", "disassemble connection" or "integral connection"; it may indicate a direct connection or an indirect connection. For those skilled in the art, specific meanings of the above terms in the present disclosure may be understood depending on specific situations.

The cap assembly of the secondary battery provided by an embodiment of the present disclosure can cover an opening of a case of the secondary battery to seal an electrode assembly and electrolyte used to produce an electrochemical reaction into the case and enable an electrical connection between the electrode assembly and conductive parts outside the case. Also, with the cap assembly of the embodiment of the present disclosure, when the pressure inside the case rises beyond a predetermined threshold, a deformable sheet can deform to be electrically disconnected from a first portion of a conductive sheet, thus cutting off a charging circuit. At the same time, since the conductive sheet is connected with a cap plate through an isolator, a large external short-circuit current can be avoided during a nail penetration test of the secondary battery so as to prevent safety accidents such as fire caused by sparking at the nail.

For a better understanding of the present disclosure, a cap assembly and a secondary battery according to embodiments of the present disclosure will be described in detail below with reference to FIG. 1 to FIG. 14.

Figure 2:
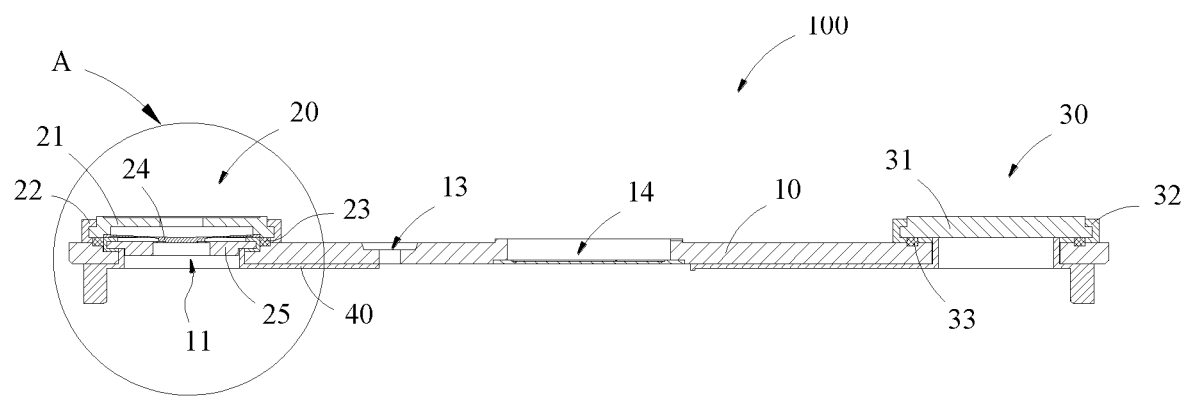
FIG. 2 is a cross-sectional structural diagram of the cap assembly of FIG. 1 taken along a longitudinal section line.
Figure 3:
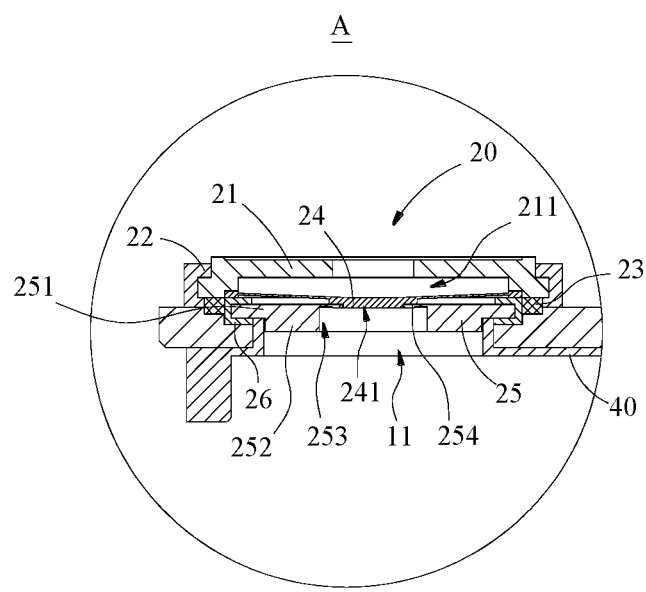
FIG. 3 is an enlarged partial view of a portion A of the cap assembly of FIG. 2.

FIG. 1 is a schematic diagram of an exploded structure of a cap assembly 100 of a second battery according to an embodiment of the present disclosure; FIG. 2 is a cross-sectional structural diagram of the cap assembly 100 of FIG. 1 taken along a longitudinal section line; FIG. 3 is an enlarged partial view of a portion A of the cap assembly 100 of FIG. 2. As shown in FIG. 1 to FIG. 3, the cap assembly 100 is connected at an opening of a case of the secondary battery in such a way to seal an electrode assembly into the case. The cap assembly 100 may generally include a cap plate 10, a terminal assembly 20, a terminal assembly 30, and a lower insulator 40.

Thus, in the embodiment of the present disclosure, a deformable sheet 24 may be attached to a terminal board 21 in a terminal assembly 20 on the cap plate 10 by providing the deformable sheet 24 and a conductive sheet 25 between the terminal board 21 and the electrode assembly inside the case. The terminal board 21 corresponds to an electrode lead-out hole 11. The conductive sheet 25 has a first portion 251. The first portion 251 is located between the terminal board 21 and the cap plate 10, and an outer peripheral surface thereof protrudes out of an inner wall of the electrode lead-out hole 11 on the cap plate 10. The outer peripheral surface of the first portion 251 of the conductive sheet 25 is surrounded by an isolator 26; the conductive sheet 25 is connected to the cap plate 10 through the isolator 26; and the isolator 26 and the first portion 251 of the conductive sheet 25 are located at a side of the electrode lead-out hole 11. By configuring the deformable sheet 24 to be deformed in response to an increase in the pressure inside the secondary battery, the deformable sheet 24 can be deformed to be disconnected from the first portion 251 when a gas pressure inside the second battery exceeds a predetermined pressure threshold, thereby avoiding continuing to overcharge the secondary battery and preventing the secondary battery from exploding.

Since the conductive sheet 25 is connected to the cap plate 10 through the isolator 26, the terminal board 21 and the cap plate 10 may be insulated from each other. Alternatively, a resistance member may be provided between the terminal board 21 and the cap plate 10, so that the terminal board 21 can be electrically connected to the cap plate 10 through the resistance member. In this way, when a nail penetration test is performed on the secondary battery, the current generated in the circuit of the secondary battery can be limited to be not too large, thereby preventing the second battery from accidents such as fire, etc. Further, the conductive sheet 25 may not occupy too much space inside the case, and thus the energy density of the secondary battery can be increased.

Figure 5:
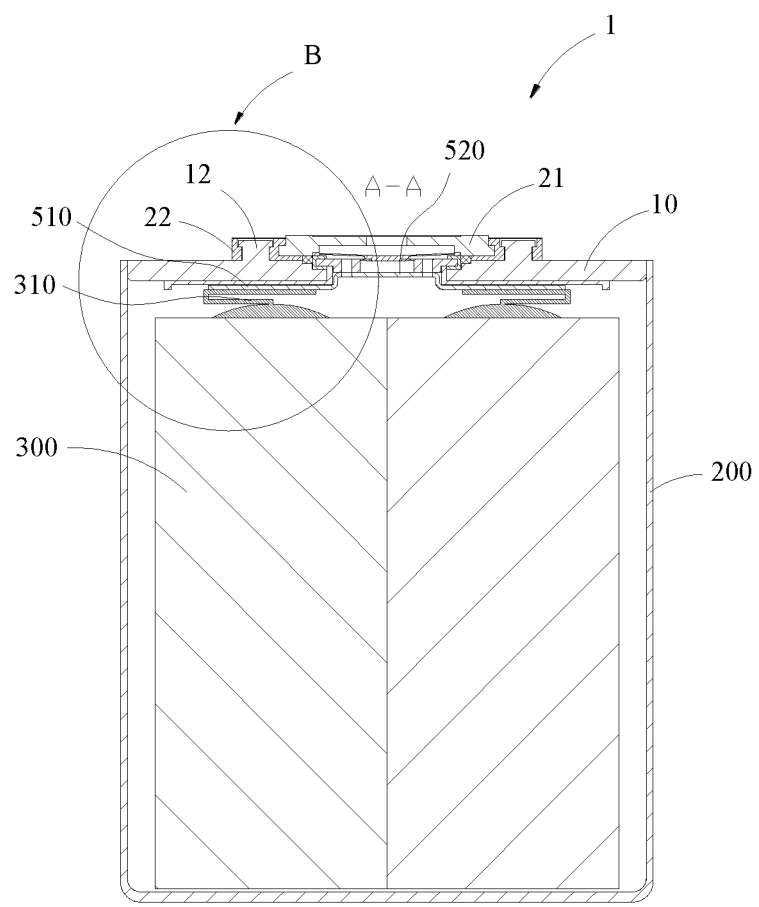
FIG. 5 is a cross-sectional structural diagram of the second battery of FIG. 4 taken along a section line A-A.

According to an exemplary embodiment of the present disclosure, the case 200 (as shown in FIG. 5) is made of a metal material and has a substantially cuboid shape to form a cavity for accommodating the electrode assembly. The electrode assembly 300 is placed in the cavity of the case 200 together with the electrolyte and the electrode assembly 300 is formed by spirally winding or sequentially stacking a positive electrode plate, a negative electrode plate and a separator. The separator is an insulator between the positive electrode plate and the negative electrode plate.

As shown in FIG. 1 and FIG. 2, according to an exemplary embodiment of the present disclosure, specifically, the cap plate 10 is in the shape of a thin plate and has a size and shape matched with the opening of the case 200 so as to be capable of being connected at the opening of the case 200. The cap plate 10 is made of a metal material, for example, the same metal material as that of the case 200. In this embodiment, the cap plate 10 is provided with the electrode lead-out hole 11, a riveting member 12, a liquid injection hole 13 and an anti-explosion valve assembly 14. The cap plate 10 is provided with two electrode lead-out holes 11 for allowing the terminal assembly 20 and the terminal assembly 30 being electrically connected to one of the positive electrode plate and the negative electrode plate in the electrode assembly located inside the case 200, respectively.

The liquid injection hole 13 is formed on the cap plate 10 in a predetermined size, so that the electrolyte can be injected into the case 200 through the liquid injection hole 13 after the cap plate 10 covers the opening of the case 200 and is hermetically connected with the case 200. The anti-explosion valve assembly 14 may have a conventional structure (for example, by providing a rupture disc) and may be disposed at a substantially central position of the cap plate 10. When the gas pressure inside the second battery becomes too large as a result of over-charging, over-discharging, or over-heating of the second battery, the rupture disc in the anti-explosion valve assembly 14 can be broken so that the gas produced inside the secondary battery can be exhausted to the outside via a through hole of the anti-explosion valve assembly 14, thereby being able to prevent the secondary battery from exploding.

In order to maintain the insulation between the cap plate 10 and the electrode assembly 300 inside the case as well as between the cap plate 10 and a wiring board 500 (as shown in FIG. 5), the lower insulator 40 is generally made of a plastic material, has a substantially plate shape, and is located at a surface of the cap plate 10 facing the inner side of the case 200. The lower insulator 40 is provided with two through holes (i.e., a first through hole) and a first insulator 41 disposed along an outer periphery of the two through holes. The two through holes are respectively opposite to the two electrode lead-out holes 11 provided on the cap plate 10.

In this embodiment, the first insulating member 41 has an annular structure, and a body part of the first insulator 41 has a size adapted to the electrode lead-out hole 11, so that when the first insulator 41 is inserted into the electrode lead-out hole 11, the lower insulator 40 can be connected to the cap plate 10 by an interference fit between the electrode lead-out hole 11 and the body part of the first insulator 41. Further, an end face of the body part of the first insulator 41 close to an electrode terminal protrudes from the surface of the cap plate 10 near the electrode terminal.

In an exemplary embodiment, the terminal assembly 20 may generally include a first electrode terminal, a fixing member 22, a sealing member 23, a deformable sheet 24, a conductive sheet 25, and an isolator 26. The terminal assembly 30 may generally include a second electrode terminal, a fixing member 32, and a sealing member 33. Since the structure of the terminal assembly 20 and its mounting on the cap plate 10 are similar to those of the terminal assembly 30 in this embodiment, only the structure of the terminal assembly 20 and its mounting on the cap plate 10 are described as an example. Further, the following description will be provided in such an exemplary way that the terminal assembly 20 is a terminal assembly at the positive electrode and the terminal assembly 30 is a terminal assembly at the negative electrode. Of course, the embodiment of the present disclosure is not limited thereto. In other embodiments, the terminal assembly 20 may alternatively be a terminal assembly at the negative electrode. Correspondingly, the terminal assembly 30 may be a terminal assembly at the positive electrode. In an example, the first electrode terminal may include the terminal board 21 and the second electrode terminal may include a terminal board 31.

According to an exemplary embodiment of the present disclosure, the terminal board 21 has a square sheet or plate structure and is fixed to the fixing member 22 in such a way that its outer peripheral surface is at least partially surrounded by the fixing member 22. Then the terminal board 21 is fixed onto the cap plate 10 through the fixing member 22 and opposite to the electrode lead-out hole 11. In an example, the terminal board 21 and the fixing member 22 may be engaged by an integral injection molding process.

In an alternative embodiment, a surface of the terminal board 21 facing the cap plate 10 is recessed to form an accommodating cavity 211 above the electrode lead-out hole 11 (i.e., relative to the inside of the case 200), so that the deformable sheet 24 can flip inside the accommodating cavity 211 after the terminal board 21 is fixed on the cap plate 10. By providing the accommodating cavity 211, the deformable sheet 24 can be allowed to easily flip without the need of separately providing a flipping space. In this way, it is possible to avoid a waste of the height space of the secondary battery, so as to reserve as much space as possible for the disposition of the electrode assembly inside the secondary battery and thus increase the energy density of the secondary battery.

In an exemplary embodiment, the fixing member 22 is a hard plastic member. For example, the fixing member 22 may be made of a high-temperature-resistant insulating plastic material such as one or more of polyphenylene sulfide (PPS), perfluoroalkoxy resin (PFA) or polypropylene (PP) by an integral injection molding process, so that the fixing member 22 can be in close contact with the first electrode terminal while being also able to be tightly connected to the cap plate 10.

With continued reference to FIGS. 1 to 3, specifically, the fixing member 22 has an accommodation space 223 adapted to the shape of the terminal board, so as to contain the terminal board in the accommodation space 223 and be affixed to the terminal board 21. In this way, a part of the fixing member 22 is clamped between the terminal board 21 and the cap plate 10. In order to increase the fastening force for bonding the terminal board 21 and the fixing member 22 to each other, an annular convex portion is provided on the outer peripheral surface of the terminal board 21. Correspondingly, an annular concave portion for accommodating the annular convex portion is provided on an inner wall surface of the fixed member 22 being affixed to the terminal board 21. When the terminal board 21 is placed in the accommodation space 223 of the fixing member 22, the annular convex portion and the annular concave portion form an engaging structure with each other so that the terminal board 21 can be firmly connected in the fixing member 22. Alternatively, an accommodation space adapted to the shape of the terminal board 21 may also be formed between the fixing member 22 and the cap plate 10 for accommodating the terminal board 21 (in this case, the fixing member 22 does not have a portion clamped between the terminal board 21 and the cap plate 10). Of course, the fixing as mentioned herein means that the terminal board 21 may not have movements in the thickness direction relative to the fixing member 22.

After the terminal board 21 and the fixing member 22 are connected to each other, the terminal board 21 covers the electrode lead-out hole 11 and the outer peripheral surface of the terminal board 21 protrudes from the inner wall of the electrode lead-out hole 11 (that is, as shown in FIG. 3, the cross-sectional dimension of the terminal board 21 is larger than that of the electrode lead-out hole 11). Also, the surface of the terminal board 21 away from the cap plate 10 protrudes beyond the surface of the fixing member 22 away from the cap plate 10 (that is, as shown in FIG. 3, the upper surface of the terminal board 21 is higher than that of the fixing member 22). Meanwhile, a through hole 221 is disposed on a side of the fixing member 22 close to the cap plate 10 so that the terminal board 21 can be exposed out of the inside of the case 200 through the through hole 221 and thus be electrically connected with the electrode assembly 300.

Figure 4:
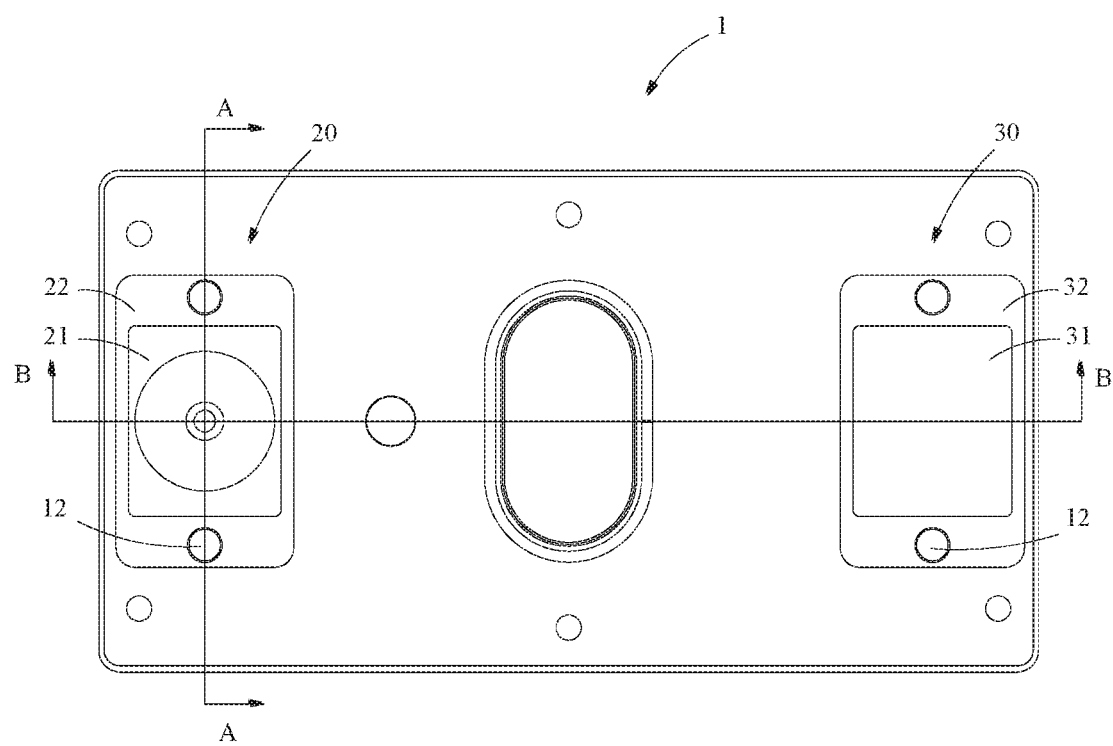
FIG. 4 is a schematic top view of a structure of a secondary battery according to an embodiment of the present disclosure.
Figure 6:
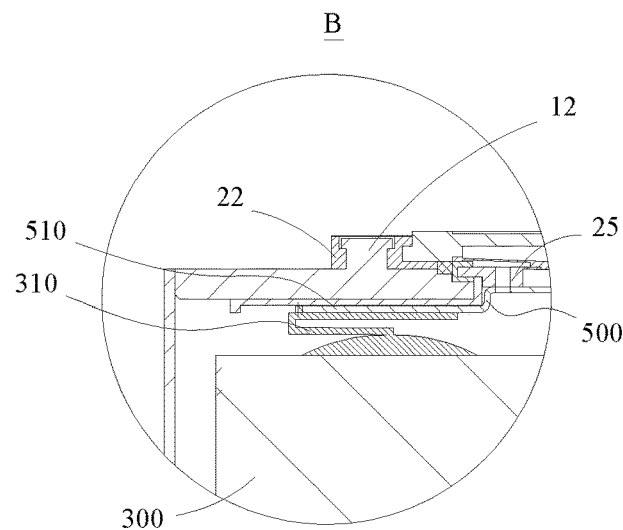
FIG. 6 is an enlarged partial view of a portion B of the second battery of FIG. 5.

FIG. 4 is a schematic top view of a structure of a secondary battery 1 according to an embodiment of the present disclosure; FIG. 5 is a cross-sectional structural diagram of the second battery 1 of FIG. 4 taken along a section line A-A; FIG. 6 is an enlarged partial view of a portion B of the second battery 1 of FIG. 5. As shown in FIG. 1 and FIGS. 4-6, specifically, according to an embodiment of the present disclosure, a connection member for fixing the fixing member 22 onto the cap plate 10 may include the riveting member 12 having a nail body 121 and a limiting portion 122. One end of the nail body 121 is connected to an upper surface of the cap plate 10 (i.e., a surface of the cap plate 10 facing away from the inside of the case), and the other end of the nail body 121 is connected to the limiting portion 122. An outer peripheral surface of the limiting portion 122 protrudes out of an outer peripheral surface of the nail body 121. Two opposite sides of the fixing member 22 respectively extend outward to form extended edges, and at least one connection hole 222 is provided at each extending edge. The aperture of the connection hole 222 is adapted to the size of the nail body 121 of the riveting member 12 (as shown in FIG. 1).

In a specific implementation, the riveting member 12 can fix the fixing member 22 onto the cap plate 10 in the following ways. In a specific example, the nail body 121 may be integrally disposed on the cap plate 10. After the nail body 121 passes through the connection hole 222 provided on the fixing member 22, a force is applied at an end of the nail body 121 away from the cap plate 10 until the limiting portion 122 is formed at the end of the nail body 121 and the limiting portion 122 and the surface of the fixing member 22 away from the cap plate 10 are engaged against each other to fix the fixing member 22 onto the cap plate 10.

In another specific example, the nail body 121 and the limiting portion 122 may be formed as an integral structure. The nail body 121 is provided with a screw thread structure, and correspondingly, the cap plate 10 is provided with a screw thread hole adapted to the screw thread structure of the nail body 121. As such, after the nail body 121 passes through the connection hole 222 provided on the fixing member 22, the limiting portion 122 and the surface of the fixing member 22 away from the cap plate 10 may be engaged against each other, and the fixing member 22 may be fixed on the cap plate 10 through the fastening of the screw thread structure of the nail body 121 into the corresponding screw thread hole on the cap plate 10.

In addition, in yet another specific example, the fixing member 22 can be directly formed on the cap plate 10 having the riveting member 12 by an integral injection molding process, so that the riveting member 12 can be directly wrapped inside the fixing member 22 and engaged to the fixing member 22 so as to fix the fixing member 22 onto the cap plate 10. Moreover, the integral injection molding process may not cause any damage to the structure of the fixing member 22.

In an alternative embodiment, the connection member for fixing the fixing member 22 may further include a first connection plate (not shown in the figures). Specifically, the first connection plate is made of a metal material and includes an engaging portion and a contact portion connected with the engaging portion, wherein the contact portion has a prismatic structure and has a recessed portion formed on a side of the contact portion, and the engaging portion is a flange connected at an edge of an opening of the recessed portion.

Each of the two opposite extending edges of the fixing member 22 is provided with a notch. On two opposite sidewalls thereof, the notch is provided with a groove along the longitudinal direction for accommodating the engaging portion of the first connection plate, so that the engaging portion of the first connection plate can be inserted into the groove of the notch and the contact portion of the first connection plate can be exposed out of the notch and contact with the cap plate 10. Thus, the contact portion of the first connection plate can be welded to the cap plate 10, and then the fixing member 22 can be fixed to the cap plate 10 through the first connection plate. By providing the recessed portion on the contact portion of the first connection plate, the laminated thickness of the contact portion and the cap plate 10 can be reduced so as to facilitate the welding connection between the first connection plate and the cap plate 10. In an alternative embodiment, the upper surface of the contact portion and the upper surface of the cap plate are substantially in a same level. In this case, a butt-seam welding may be adopted.

In an alternative embodiment, the connection member may be an undercut integrally formed on the fixing member 22. Correspondingly, an undercut hole (not shown in the figures) adapted to the undercut is provided on the cap plate 10. Specifically, a plurality of undercut holes may be disposed around the electrode lead-out hole 11 and located at the contact position of the fixing member 22 and the cap plate 10. The aperture of the undercut hole increases along the direction from the fixing member 22 to the cap plate 10. That is to say, the aperture of the undercut hole gradually decreases along the direction from the bottom to the opening of the undercut hole. Correspondingly, a surface of the fixing member 22 facing the cap plate 10 is provided with the undercut adapted to the shape of the undercut hole. Thus, the fixing member 22 can be fixed to the cap plate 10 by the engagement between the undercut provided on the fixing member 22 and the undercut hole provided on the cap plate 10. Of course, the increasing of the aperture of the undercut hole mentioned herein does not require that the aperture of the undercut hole regularly increases along the direction from the fixing member 22 to the cap plate 10, but means that the aperture of one end of the undercut hole far away from the fixing member 22 is larger than that of the other end of the undercut hole close to the fixing member 22. In other words, it is only required that the aperture of the bottom of the undercut hole is larger than the aperture of the top of the undercut hole so as to allow for the engagement between the undercut and the undercut hole.

Of course, the specific structure of the fixing member 22 will not be limited in the embodiment of the present disclosure. In other embodiments, in case that the terminal board 21 is circular or in other shapes, the fixing member 22 only needs to be provided with an accommodating space adapted to the shape of the terminal board 21. In addition, the riveting member 12 is arranged on a side of the cap plate 10 facing away from the fixing member 22, so that the cap plate 10 can be connected to the lower insulator 40 through the riveting member 12 in a manner of connection with the fixing member 22.

In addition, in the present embodiment, for example, the lower insulator 40 may also be welded to the side of the cap plate 10 facing the inside of the case by using a second connection plate similar to the first connection plate in the above described embodiment. The specific manner of connecting the lower insulator 40 to the cap plate 10 through the second connection plate is the same as that of welding and connecting the above-mentioned fixing member 22 to the cap plate 10 through the first connecting plate, so the description thereof will not be repeated.

With continued reference to FIGS. 1 to 3, the sealing member 23 is disposed between the terminal board 21 and the cap plate 10 according to an embodiment of the present disclosure. In the embodiment, the sealing member 23 is disposed between the terminal board and the cap plate 10 and surrounds the electrode lead-out hole 11.

In an alternative embodiment, the sealing member 23 is annular, and the cap plate 10 is provided with an annular first depressed portion (not shown in the figures) around the electrode lead-out hole 11. The sealing member 23 can be fitted into the first depressed portion (as shown in FIG. 3), so that the sealing member 23 can be located through the first depressed portion and prevented from moving between the terminal board 21 and the cap plate 10. In the embodiment, the sealing member 23 is in close contact with each of the terminal board 21, the fixing member 22, the cap plate 10 and the lower insulator 40, so that the sealing member 23 can be evenly pressed to fully fill the space of the first depressed portion. As such, the sealing effect of the sealing member 23 can be further improved. Further, the sealing member 23 is disposed outside the case, thereby preventing the sealing member 23 from contacting with the electrolyte inside the case and thus avoiding the swelling of the sealing member 23.

Of course, the specific shape of the sealing member 23 will not be limited in the embodiment of the present disclosure. In other embodiments, a rotary structure of the sealing member 23 may be replaced by a rectangle or other shapes. But the first depressed portion on the cap plate 10 needs to be provided to be adapted to the shape of the sealing member 23. In addition, in some embodiments, the fixing member 22 and the sealing member 23 may be provided in an integral form. Of course, the material of the fixing member 22 needs to have a sealing function and certain hardness.

With continued reference to FIGS. 1 to 3, according to an exemplary embodiment of the present disclosure, specifically, the deformable sheet 24 has a film-type main body portion, a protruding portion 241 disposed in a substantially central area of the main body portion, and a circumferential edge portion provided surrounding an outer peripheral surface of the main body portion, wherein the thickness of the protruding portion 241 is greater than that of the remaining portion of the deformable sheet 24. The terminal board 21 has a projected portion disposed at the edge of the bottom of the accommodating cavity 211 (i.e. viewing from the observation direction shown in FIGS. 1 to 3). The deformable sheet 24 is connected to the sink of the terminal board 21 through the circumferential edge portion, and thus electrically connected to the terminal board 21. Further, the deformable sheet 24 covers the accommodating cavity 211 and the protruding portion 241 thereof protrudes toward the inside of the case 200. The deformable sheet 24 is configured such that the main body portion of the deformable sheet 24 can flip over and deform to be bent toward the outside of the case 200 when the pressure inside the case 200 increases.

In addition, when the pressure inside the secondary battery 1 exceeds a reference pressure and makes the deformable sheet 24 flip over, the gas inside the accommodating cavity 211 may be compressed due to the flipping of the deformable sheet 24. Thus the pressure inside the accommodating cavity 211 may increase to stop the flipping of the deformable sheet 24, and even cause an incomplete flipping of the deformable sheet 24. In order to solve the problem, the terminal board 21 is further provided with an exhaust hole (not shown in the figures). The exhaust hole penetrates the top surface of the terminal board 21 in the flipping direction of the deformable sheet 24 and is opposite to the deformable sheet 24.

Figure 7:
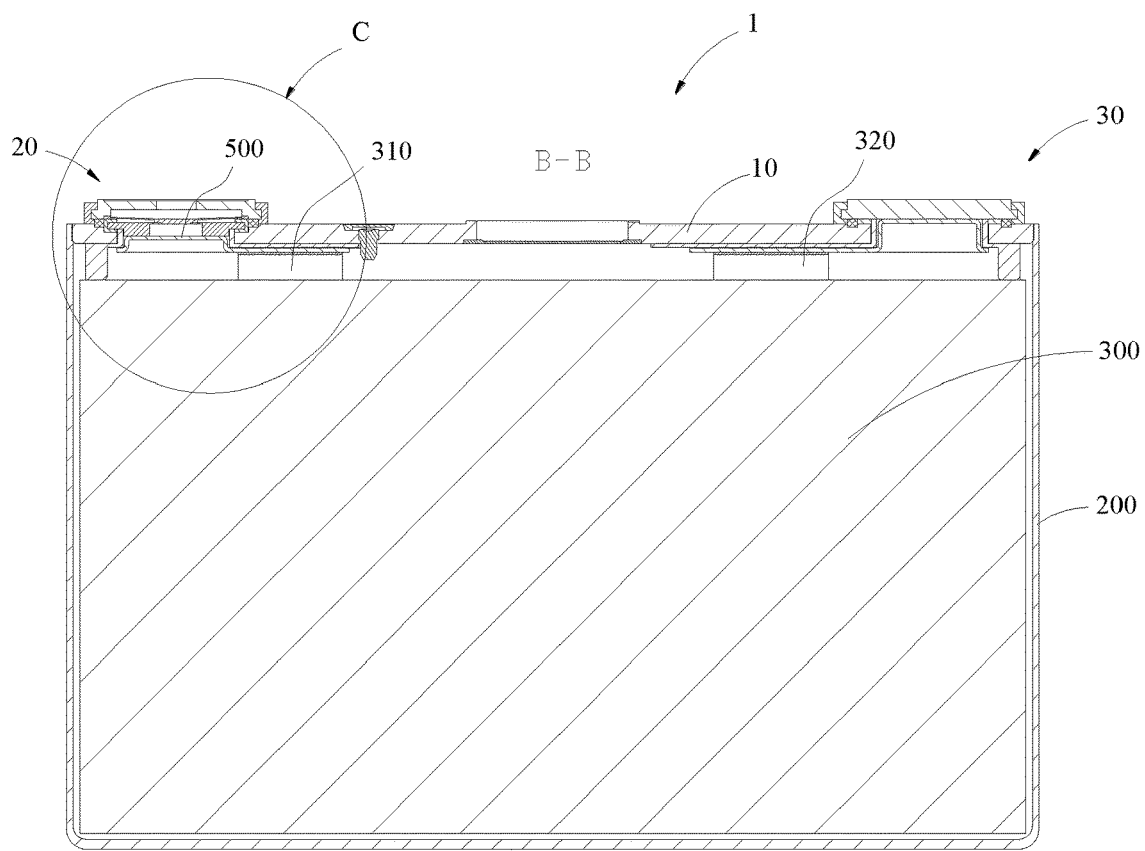
FIG. 7 is a cross-sectional structural diagram of the second battery of FIG. 4 taken along a section line B-B.
Figure 8:
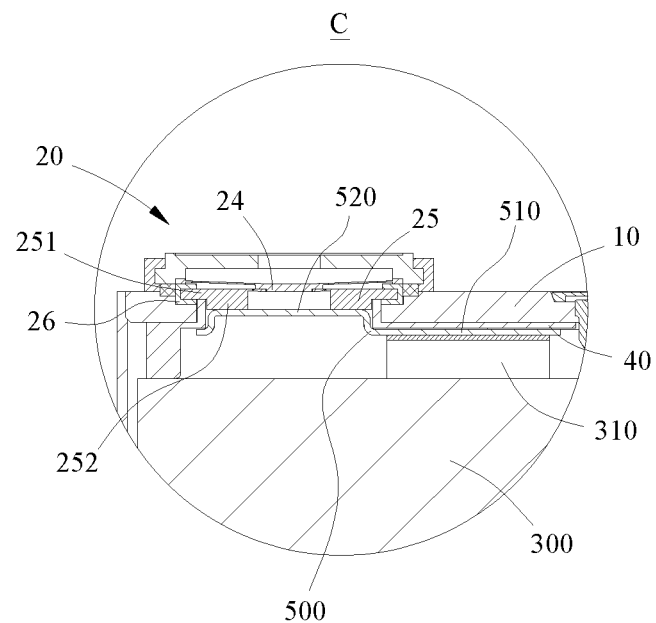
FIG. 8 is an enlarged partial view of a portion C of the second battery of FIG. 7.

FIG. 7 is a cross-sectional structural diagram of the second battery 1 of FIG. 4 taken along a section line B-B; FIG. 8 is an enlarged partial view of a portion C of the second battery 1 of FIG. 7. As shown in FIG. 3, FIG. 7 and FIG. 8, in order to enable the terminal board 21 to be successfully connected to the positive electrode plate of the electrode assembly 300 inside the case, the terminal assembly 20 further includes a conductive sheet 25. In a normal state, the deformable sheet 24 is connected with the positive electrode plate through the conductive sheet 25; when the pressure inside the secondary battery exceeds the reference pressure, the deformable sheet 24 can be flipped over to be disconnected from the conductive sheet 25 and thus the electrical connection between the terminal board 21 and the positive electrode sheet can be broken.

In this embodiment, specifically, the conductive sheet 25 includes a first portion 251, a second portion 252, a vent hole 253, and a thinner portion 254. The first portion 251 is in a disc shape and disposed between the terminal board 21 and the cap plate 10; the second portion 252 is connected at a substantially central area of the first portion 251 and extends into the electrode lead-out hole 11 so as to be connected to a first electrode tab 310 (i.e., a positive electrode tab) in the electrode assembly 300 through the wiring board 500.

In addition, the vent hole 253 penetrates the conductive sheet 25 in the flipping direction of the deformable sheet 24 and is opposite to the deformable sheet 24. As shown in FIG. 3, such a structure ensures that when gas is generated due to overcharging of the second battery, the gas can quickly reach the deformable sheet 24 to make the deformable sheet 24 flip over. The thinner portion 254 has an annular connection surface and is connected to an edge of a side of the vent hole 253 close to the deformable sheet 24. The protruding portion 241 of the deformable sheet 24 is opposite to the vent hole 253 and is connected with the thinner portion 254, so that when the deformable sheet 24 deforms, the conductive sheet 25 can be broken along the thinner portion 254 and the protruding portion 241 can be separated from the electrical connection with the second portion 252.

In case that the conductive sheet 25 includes the first portion 251, the second portion 252 and the thinner portion 254, in the normal state, the terminal board 21 is electrically connected to the positive electrode plate through the main body portion and the protruding portion 241 of the deformable sheet 24, the thinner portion 254 and the second portion 252. When the pressure inside the secondary battery exceeds the reference pressure, the deformable sheet 24 can flip over and deform to electrically disconnect the protruding portion 241 from the second portion 252, so as to cut off the electrical connection between the terminal board 21 and the positive electrode plate.

In an alternative embodiment, in order to ensure that the deformable sheet 24 can be electrically disconnected from the second portion 252 of the conductive sheet 25 when the pressure inside the secondary battery exceeds the reference pressure, the thinner portion 254 may be further provided with an indentation and a fracture portion or only one of the indentation and the fracture portion to make the conductive sheet 25 more easily broken when the pressure inside the secondary battery exceeds the reference pressure.

The isolator 26 has a rotary structure as a whole and made of an insulating material such as insulating plastic, etc. The isolator 26 has a bonding portion 261 for the conductive sheet. The bonding portion 261 for the conductive sheet is provided with a first annular groove (not shown in the figures) in its inner wall. The outer peripheral edge of the first portion 251 of the conductive sheet 25 is inserted into the first annular groove to separate the conductive sheet 25 from the cap plate 10. The bonding portion 261 for the conductive sheet is compressed tightly between the terminal board 21 and the cap plate 10.

In an alternative embodiment, the electrode lead-out hole 11 is radially expanded on the side close to the terminal board 21 so as to form a second depressed portion (not shown in the figures). The second depressed portion is located at an inner circumference of the first depressed portion and has a depth deeper than the first depressed portion. The bonding portion 261 for the conductive sheet is accommodated in the second depressed portion together with the first portion 251 fixed inside the bonding portion 261 for the conductive sheet, so as to limit the bonding portion 261 for the conductive sheet and the first portion 251 and prevent the bonding portion 261 for the conductive sheet and the first portion 251 from moving on the cap plate 10. Further, the bonding portion 261 for the conductive sheet and the first portion 251 are disposed on the cap plate 10 through the second depressed portion, so that a larger flipping space can be reserved for the deformable sheet 24 without changing the overall height of the secondary battery and occupying the inner space of the case 200. Thus it is possible to improve the energy density of the secondary battery.

Figure 9:
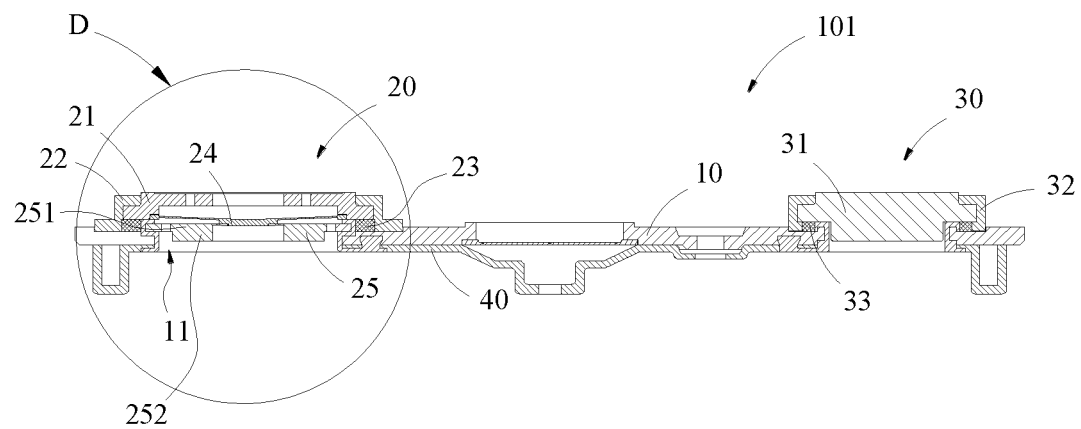
FIG. 9 is a cross-sectional structural diagram of a cap assembly according to another embodiment of the present disclosure taken along a longitudinal section line.
Figure 10:
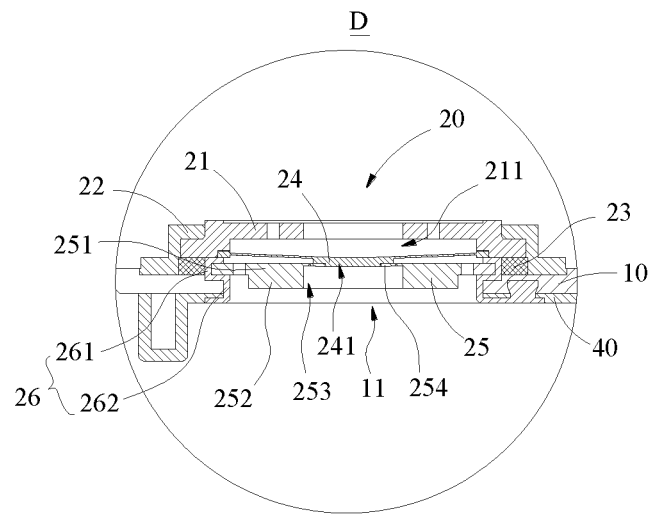
FIG. 10 is an enlarged partial view of a portion D of the cap assembly of FIG. 9.

FIG. 9 is a cross-sectional structural diagram of a cap assembly 101 according to another embodiment of the present disclosure taken along a longitudinal section line; FIG. 10 is an enlarged partial view of a portion D of the cap assembly 101 of FIG. 9. As shown in FIG. 9 and FIG. 10, in this embodiment, the same components as those of the cap assembly 100 in the above embodiment are denoted by the same reference numerals, and details of the components that have been described in detail will not be described again. In this embodiment, the cap assembly 101 is different from the cap assembly 100 in the above embodiment in that the lower insulator 40 is fixed to the side of the cap plate 10 facing the inside of the case 200 via the isolator 26.

In an exemplary embodiment, specifically, the isolator 26 includes the bonding portion 261 for the conductive sheet and a bonding portion 262 for the insulator. The bonding portion 261 for the conductive sheet has the same structure as the bonding portion 261 for the conductive sheet in the above embodiment. The bonding portion 262 for the insulator is connected to the bonding portion 261 for the conductive sheet and located on the side far from the terminal board 21 relative to the bonding portion 261 for the conductive sheet. The bonding portion 262 for the insulator includes an annular portion attached to the inner wall surface of the electrode lead-out hole 11 and an extension portion extending radially outward from the bottom edge of the annular portion, so that a second annular groove (not shown in the figures) is formed between the bonding portion 261 for the conductive sheet and the extension portion. Thus, the electrode lead-out hole 11 and the lower insulator 40 may be simultaneously mounted in the second annular groove along the electrode lead-out hole 11 of the cap plate 10 and the through hole disposed in the lower insulator 40 with respect to the electrode lead-out hole 11. In this way, the cap plate 10 and the lower insulator 40 can be simultaneously compressed through the second annular groove of the bonding portion 262 for the insulator and the lower insulator 40 can be fixed to the side of the cap plate 10 facing the inside of the case.

In addition, in an alternative embodiment, a plurality of undercuts may be disposed on a surface of the extension portion of the bonding portion 262 for the insulator facing the cap plate 10. The size of each undercut gradually decreases in the direction from the terminal board 21 to the cap plate 10. Meanwhile, a plurality of undercut holes matching the plurality of undercuts of the extension portion are disposed on the surface of the cap plate 10 facing the extension portion. With the engagement between the undercuts and the undercut holes, the lower insulator 40 can be fixed to the cap plate 10 via the isolator 26.

In an alternative embodiment, in order to ensure the safety in use of the secondary battery, it is usually necessary to perform a nail penetration test on the secondary battery. If the conductive sheet 25 is used to realize a direct electrical connection with the cap plate 10, since the resistance of metals is generally at the milliohms level, a large external short-circuit current may be generated when the secondary battery is under the nail penetration test. In this case, it is easy to cause fire or other security risks due to sparking at the nail. Therefore, it may be needed to provide a resistance member having a predetermined resistance value between the terminal board 21 and the cap plate 10. The resistance value of the resistance member is set to be greater than that of the cap plate 10, the terminal board 21 and the conductive sheet 25. By providing the resistance member, both the cap plate 10 and the terminal board 21 can be positively charged, thereby preventing the cap plate 10 and the case 200 from being corroded by the electrolyte.

In an exemplary embodiment, the resistance member is the sealing member 23 disposed between the terminal board 21 and the cap plate 10. In this case, as described in the above embodiment, the isolator 26 is made of an insulating material, and the fixing member 22 may be made of an insulating material or may be a conductive plastic having a predetermined resistance value. The sealing member 23 is made of an elastic material having sealing and conductive properties. For example, the elastic material may be obtained by adding a conductive material into a master batch having the sealing property. In an alternative embodiment, the elastic material may be rubber and may include, for example, one or more of the following materials: conductive fluorine rubber, conductive EPDM rubber and conductive nitrile rubber. The production method may be to add a conductive material in the master batch made of the fluorine rubber, the EPDM rubber or the nitrile rubber. The conductive material may include, for example, conductive carbon fiber, conductive carbon powder, conductive ceramic, or metal powder. Further, in the present embodiment, the sealing member 23 is in close contact with the terminal board 21, the fixing member 22, the cap plate 10 and the isolator 26, respectively, so that the sealing member 23 can fully fill the space formed among the cap plate 10, the terminal board 21, the fixing member 22 and the isolator 26. In this way, it may be ensured that the sealing member 23 will not be separated from the terminal board 21 and the cap plate 10 so that the resistance value of the resistance member between the terminal board 21 and the cap plate 10 can keep stable.

In another exemplary embodiment, the resistance member is the fixing member 22 disposed between the terminal board 21 and the cap plate 10. Similarly, the isolator 26 is made of an insulating material, while the sealing member 23 may be made of an insulating material or a conductive material having a predetermined resistance value. The fixing member 22 may be made of a conductive plastic having a predetermined resistance value. Since a part of the fixing member 22 is sandwiched between the terminal board 21 and the cap plate 10, a stable resistance value can be provided between the terminal board 21 and the cap plate 10 via the fixing member 22.

In still another exemplary embodiment, the resistance member includes a columnar structure (not shown in the figures) disposed between the terminal board 21 and the cap plate 10. Of course, the number of columnar structures will not be limited in the embodiment of the present disclosure. In this case, the isolator 26 is made of an insulating material, while the fixing member 22 and the sealing member 23 may be insulators and may also be conductors having a predetermined resistance value. In this embodiment, the columnar structure is made of a conductive material having a predetermined resistance value. For example, the resistance member may be a conductive ceramic column. Specifically, grooves may be relatively formed on the surface of the terminal board 21 facing the cap plate 10 and the surface of the cap plate 10 facing the terminal board 21, and then the columnar structure may penetrate the fixing members 22 and be inserted into the grooves relatively formed on the terminal board 21 and the cap plate 10. As such, the terminal board 21 and the cap plate 10 can be connected through the resistance member of the columnar structure.

Figure 11:
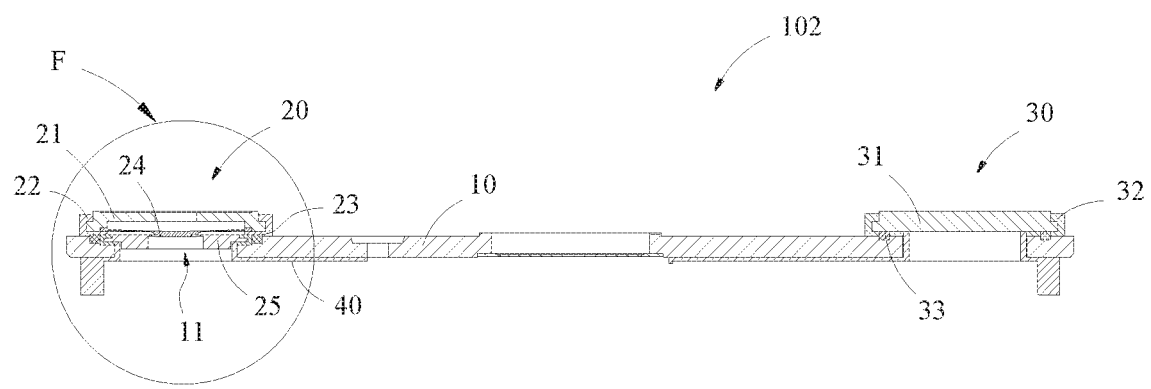
FIG. 11 is a cross-sectional structural diagram of a cap assembly according to yet another embodiment of the present disclosure taken along a longitudinal section line.
Figure 12:
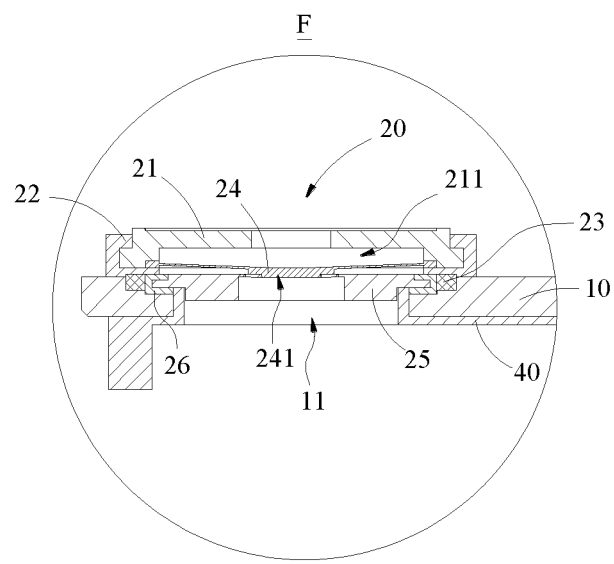
FIG. 12 is an enlarged partial view of a portion F of the cap assembly of FIG. 11.

In addition, in still other alternative embodiments, the isolator 26 itself may serve as the resistance member. FIG. 11 is a cross-sectional structural diagram of a cap assembly 102 according to yet another embodiment of the present disclosure taken along a longitudinal section line; FIG. 12 is an enlarged partial view of a portion F of the cap assembly 102 of FIG. 11. As shown in FIG. 11 and FIG. 12, in this embodiment, the same components as those of the cap assembly 102 in the above embodiment are denoted by the same reference numerals, and details of the components that have been described in detail will not be described again. In this embodiment, the cap assembly 102 is different from the cap assembly 100 in the above embodiment in that the isolator 26 itself serves as the resistance member provided between the terminal board 21 and the cap plate 10.

For example, in this embodiment, since the isolator 26 directly serves as the resistance member and is disposed between the conductive sheet 25 and the cap plate 10, the isolator 26 cannot contact with the deformable sheet 24 provided above the conductive sheet 25. That is, the terminal board 21 is electrically connected to the first portion 251 of the conductive sheet 25 through the deformable sheet 24, and then electrically connected to the cap plate 10 via the isolator 26 through the first portion 251. Specifically, the part of the fixing member 22 positioned between the terminal board 21 and the cap plate 10 entirely surrounds the annular surface of the terminal board 21 facing the side of the cap plate 10 and close to the isolator 26 and the sealing member 23, so that the terminal board 21 can be separated from the isolator 26 serving as the resistance member by the fixing member 22. Thus it is possible to avoid that the deformable sheet 24 is still electrically connected to the conductive sheet 25 through the isolator 26 after the deformable sheet 24 flips to be disconnected from the conductive sheet 25.

Figure 13:
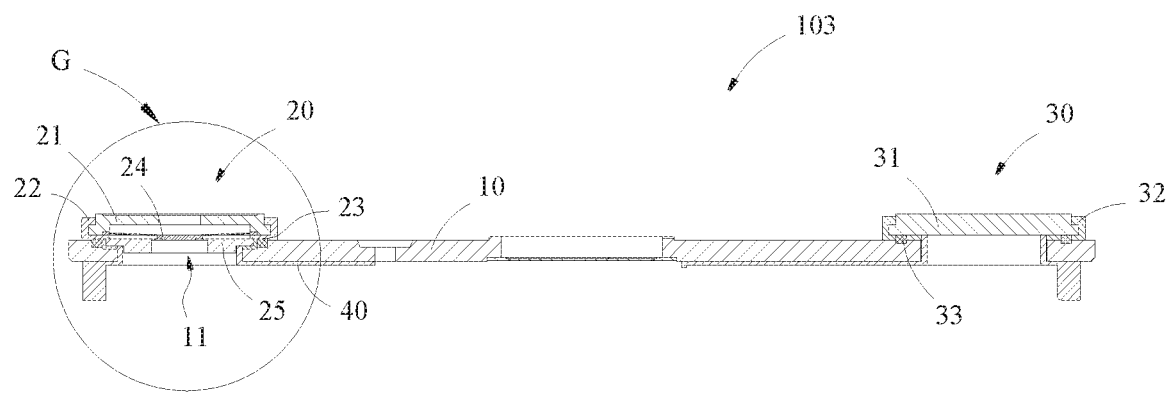
FIG. 13 is a cross-sectional structural diagram of a cap assembly according to still another embodiment of the present disclosure taken along a longitudinal section line.
Figure 14:
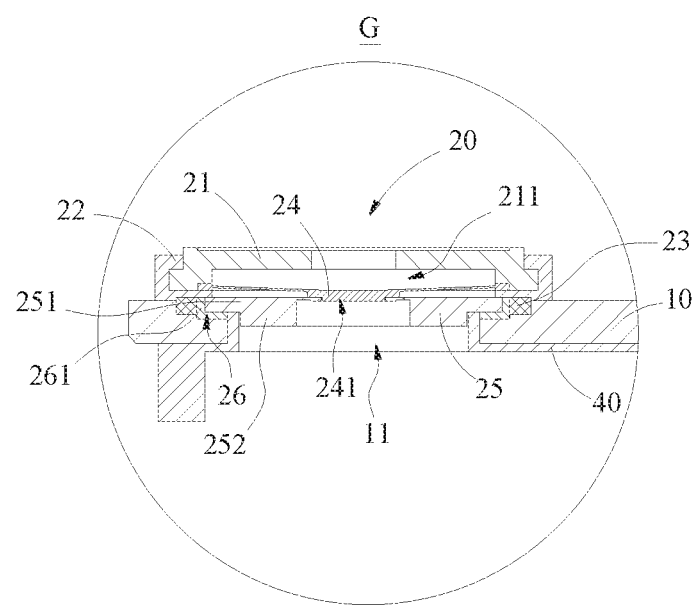
FIG. 14 is an enlarged partial view of a portion G of the cap assembly of FIG. 13.

FIG. 13 is a cross-sectional structural diagram of a cap assembly 103 according to still another embodiment of the present disclosure taken along a longitudinal section line; FIG. 14 is an enlarged partial view of a portion G of the cap assembly 103 of FIG. 13. As shown in FIG. 13 and FIG. 14, in this embodiment, the same components as those of the cap assembly 102 in the above embodiment are denoted by the same reference numerals, and details of the components that have been described in detail will not be described again. In this embodiment, the cap assembly 103 is different from the cap assembly 102 in the above embodiment in that the first annular groove provided on the inner peripheral wall of the bonding portion 261 for the conductive sheet of the isolator 26 is replaced by a depressed portion. That is, the bonding portion 261 for the conductive sheet surrounds the outer peripheral edge of the conductive sheet 25 in both the bottom and the outer periphery, and the conductive sheet 25 and the spacer 26 are simultaneously in contact with the surface of the fixing member 22 facing the cap plate 10. In this way, the thickness of the inner wall of the isolator 26 can be increased to ensure a sufficient resistance between the isolator 26 and the cap plate 10 to avoid an excessive current flowing through the conductive sheet 25 when a short circuit occurs in the secondary battery. The inner wall of the conductive sheet 25 may be melted due to the excessive current, thereby making the conductive sheet 25 and the deformable sheet 24 to be connected once again to cause fire or other safety accidents.

In the cap assembly 102 and the cap assembly 103 in the above embodiments, by providing the isolator 26 as the resistance member, the terminal board 21 can be electrically connected to the cap plate 10 through the isolator 26. During the nail penetration test, the current in the circuit of the battery can be reduced. Then the heating at the nail can be reduced to prevent the occurrence of sparks and make the battery under control.

According to another embodiment of the present disclosure, as shown in FIG. 4 to FIG. 8, there is further provided a secondary battery 1 including a case 200, an electrode assembly 300, and a cap assembly 100. Of course, in this embodiment, the cap assembly 100 may be replaced with the cap assembly 101, the cap assembly 102, or the cap assembly 103 in other embodiments.

The case 200 may be made of metal material, such as aluminum, aluminum alloy, or nickel-plated steel. The case 200 is formed in a rectangular box shape and has an opening to its inside accommodation space.

The electrode assembly 300 may be formed by stacking or winding a first electrode, a second electrode, and a separator together, where the separator is an insulator interposed between the first electrode and the second electrode. In this embodiment, as an example, the description will be provided by taking the first electrode as a positive electrode plate and the second electrode as a negative electrode plate. Similarly, in other embodiments, the first electrode may be a negative electrode plate, and the second electrode may be a positive electrode plate. In addition, active materials for the positive electrode plate may be coated on a coating area of the positive electrode plate, and active materials for the negative electrode plate may be coated on a coating area of the negative electrode plate. A portion extending from the coating area of the positive electrode plate is referred to as a positive electrode tab, i.e., the first electrode tab 310; and a portion extending from the coating area of the negative electrode plate is referred to as a negative electrode tab, i.e., the second electrode tab 320. The cap assembly covers the opening of the case 200 and encloses the electrode assembly 300 in the case.

The secondary battery 1 further includes a wiring board 500 located inside the case 200. The secondary battery 1 has two wiring boards 500 respectively disposed corresponding to the positive electrode plate and the negative electrode plate (as shown in FIG. 1). For example, the two wiring boards 500 are respectively connected as a transitional member between the conductive sheet 25 and a first electrode plate, as well as between the terminal board 21 and a second electrode plate. That is, the two terminal blocks 500 are respectively used for electrical connections between a positive electrode terminal and the positive electrode tab (the first electrode tab 310) and between a negative electrode terminal and the negative tab (the second electrode tab 320). Further, as an example, the structure of the wiring board 500 will be illustrated taking the wiring board 500 as a transitional connection member between the terminal board 21 and the first electrode plate.

As shown in FIG. 8, according to an embodiment of the present disclosure, the wiring board 500 includes a main body portion 510 and an extension portion 520 connected to the main body portion 510, wherein the main body portion 510 is located on a side of the cap plate 10 away from the terminal board 21 and insulated from the cap plate 10 by the lower insulator 40. The main body portion 510 can be electrically connected with the first electrode tab 310; and the extension portion 520 can extend into the electrode lead-out hole 11 and be electrically connected to the second portion 252 of the conductive sheet 25 located in the electrode lead-out hole 11. As a result, the terminal board 21 can be electrically connected to the first electrode plate.

In an exemplary embodiment, the extension portion 520 is a protrusion provided on a surface of the main body portion 510 on a side close to the cap plate 10. By providing the protrusion, a recessed portion may be formed on a surface of the main body portion 510 on a side away from the cap plate 10. That is, the protrusion includes a top wall and an annular sidewall connected to the top wall, such that the protrusion is open on the side of the main body portion 510 away from the cap plate 10. In an exemplary embodiment, when the main body portion 510 and the extension portion 520 are of an integral structure, the extension portion 520 may be a cylindrical protrusion formed on the main body portion 510 by a stamping method. In this way, the main body portion 510 can be attached to the surface of the lower insulator 40 on a side away from the top cover 10, so that the extension portion 520 can extend into the electrode lead-out hole 11 to be in contact with the terminal board 21 and the extension portion 520 can be welded to the terminal board 21. In addition, the extension portion 520 is further provided with a through hole (i.e., a second through hole) corresponding to the vent hole 253 provided on the conductive sheet 25, so that the deformable sheet 24 can communicate with the inside of the case 200 through the vent hole 253 on the conductive sheet 25 and the through hole on the wiring board 500. In this way, when gas is generated inside the case 200 of the secondary battery 1, the gas can be timely circulated to the deformable sheet 24 so that the deformable sheet 24 can flip timely to be disconnected from the conductive sheet 25 when the gas pressure exceeds a predetermined pressure threshold (i.e., a reference pressure value).

The invention may be embodied in other specific forms without departing from the spirit and essential characteristics thereof. The embodiments discussed therefore should be considered in all aspects as illustrative and not restrictive. The scope of the invention is defined by the appended claims rather than by the foregoing description, and those modifications falling within the meaning and equivalents of the claims are thus intended to be embraced by the scope of the invention. Different technical features in different embodiments may be combined to obtain beneficial effects. Other variations of the described embodiments can be understood and practiced by those skilled in the art upon studying the drawings, the specification and the claims herein.

What is claimed is:

1. A cap assembly for a secondary battery, comprising a cap plate and a terminal assembly, wherein the cap plate has an electrode lead-out hole and the terminal assembly comprises a terminal board, a fixing member, a deformable sheet, a conductive sheet and an isolator, wherein:
   the deformable sheet is attached to the terminal board;
   the conductive sheet comprises a first portion, wherein the first portion is provided between the terminal board and the cap plate and an outer peripheral surface of the first portion protrudes out of an inner wall of the electrode lead-out hole;
   an outer peripheral surface of the conductive sheet is surrounded by the isolator, and the conductive sheet is connected with the cap plate through the isolator;
   the terminal board is fixed to a side of the cap plate through the fixing member and covers the electrode lead-out hole, and the terminal board is electrically connected with the first portion through the deformable sheet;
   the deformable sheet is configured to deform to be electrically disconnected from the first portion in response to an increase in a pressure inside the secondary battery.

2. The cap assembly of claim 1, wherein the isolator has a rotary structure and comprises a bonding portion for the conductive sheet; the bonding portion for the conductive sheet is provided with a first annular groove in its inner wall; an outer peripheral edge of the first portion is inserted into the first annular groove to separate the conductive sheet from the cap plate; and the bonding portion for the conductive sheet is compressed tightly between the terminal board and the cap plate.

3. The cap assembly of claim 2, wherein the electrode lead-out hole is radially expanded on a side close to the terminal board so as to form a depressed portion on the cap plate, and the bonding portion for the conductive sheet and the first portion are accommodated in the depressed portion.

4. The cap assembly of claim 2, further comprising a lower insulator, wherein the lower insulator is provided with a first through hole corresponding to the electrode lead-out hole; and the lower insulator is fixed to a side of the cap plate away from the terminal board through the isolator.

5. The cap assembly of claim 4, wherein the isolator further comprises a bonding portion for the insulator connected with the bonding portion for the conductive sheet; the bonding portion for the insulator is provided with a second annular groove in its outer wall; a circumferential edge of the electrode lead-out hole and a circumferential edge of the first through hole are simultaneously mounted in the second annular groove so as to fix the lower insulator to the isolator.

6. The cap assembly of claim 1, wherein the terminal board is provided with an accommodating cavity on a side facing the electrode lead-out hole, and the deformable sheet covers the accommodating cavity.

7. The cap assembly of claim 1, wherein the deformable sheet further comprises a protruding portion provided on a side of the deformable sheet close to the cap plate; the protruding portion has a thickness greater than that of a remaining portion of the deformable sheet; and the deformable sheet is connected with the first portion of the conductive sheet through the protruding portion.

8. The cap assembly of claim 7, wherein the conductive sheet is provided with a vent hole communicating with the deformable sheet along a flipping direction of the deformable sheet.

9. The cap assembly of claim 8, wherein the conductive sheet further comprises a thinner portion and the first portion is connected with the protruding portion through the thinner portion, so that when the deformable sheet deforms, the conductive sheet is broken along the thinner portion and the protruding portion is electrically disconnected from the first portion.

10. The cap assembly of claim 1, wherein the isolator is made of an insulating material; the cap assembly further comprises a resistance member; the terminal board is electrically connected with the cap plate through the resistance member; and the resistance member has a resistance value greater than that of the cap plate, the terminal board or the conductive sheet.

11. The cap assembly of claim 10, wherein the resistance member comprises a column that penetrates the fixing member and is respectively in contact with the terminal board and the cap plate.

12. The cap assembly of claim 10, further comprising a sealing member, wherein the sealing member surrounds the electrode lead-out hole and is compressed tightly between the terminal board and the cap plate.

13. The cap assembly of claim 12, wherein the sealing member is respectively in contact with the terminal board and the cap plate and serves as the resistance member; and the sealing member is made of conductive rubber having a predetermined resistance value.

14. The cap assembly of claim 10, wherein the fixing member serves as the resistance member and is made of conductive plastic having a predetermined resistance value.

15. The cap assembly of claim 1, further comprising a connection member, wherein the fixing member is fixed to the cap plate through the connection member; and at least part of an outer peripheral surface of the terminal board is surrounded by the fixing member so that the terminal board is fixed to the fixing member.

16. A secondary battery, comprising:
a case having an opening;
an electrode assembly accommodated in the case, comprising a first electrode plate, a second electrode plate and a separator disposed between the first electrode plate and the second electrode plate; and
the cap assembly of claim 1, wherein the cap assembly covers the opening of the case and encloses the electrode assembly in the case.

17. The secondary battery of claim 16, further comprising a wiring board, wherein the first electrode plate is connected with the conductive sheet through the wiring board.

18. The secondary battery of claim 17, wherein the wiring board comprises a main body portion and an extension portion connected to the main body portion; the main body portion is located on a side of the cap plate away from the terminal board; and the extension portion extends into the electrode lead-out hole and is electrically connected with the conductive sheet.

19. The secondary battery of claim 17, wherein the conductive sheet further comprises a second portion that is connected to the first portion and extends into the electrode lead-out hole to be electrically connected with the wiring board.

20. The secondary battery of claim 18, wherein the wiring board has a recessed portion formed on a side of the main body portion away from the cap plate by being provided with the extension portion; the extension portion is provided with a second through hole corresponding to the vent hole on the conductive sheet; and the deformable sheet communicates with the inside of the case through the second through hole and the vent hole.

* * * * *